STRIP SHINGLE OF IMPROVED AESTHETIC CHARACTER

Filed Jan. 6, 1970 5 Sheets-Sheet 1

INVENTOR/S

ALBERT R. MORGAN, PAUL R. ANTOUN
HOWARD E. CALLAHAN & THEODORE R. MAUGEL

BY *Melville, Strasser, Foster and Hoffman*
ATTORNEYS

STRIP SHINGLE OF IMPROVED AESTHETIC CHARACTER

Filed Jan. 6, 1970 5 Sheets-Sheet 2

INVENTOR/S

ALBERT R. MORGAN, PAUL R. ANTOUN
HOWARD E. CALLAHAN & THEODORE R. MAUGEL

BY Melville, Strasser, Foster and Hoffman
ATTORNEYS

INVENTOR/S
ALBERT R. MORGAN, PAUL R. ANTOUN,
HOWARD E. CALLAHAN & THEODORE R. MAUGEL
BY Melville, Strasser, Foster and Hoffman
ATTORNEYS

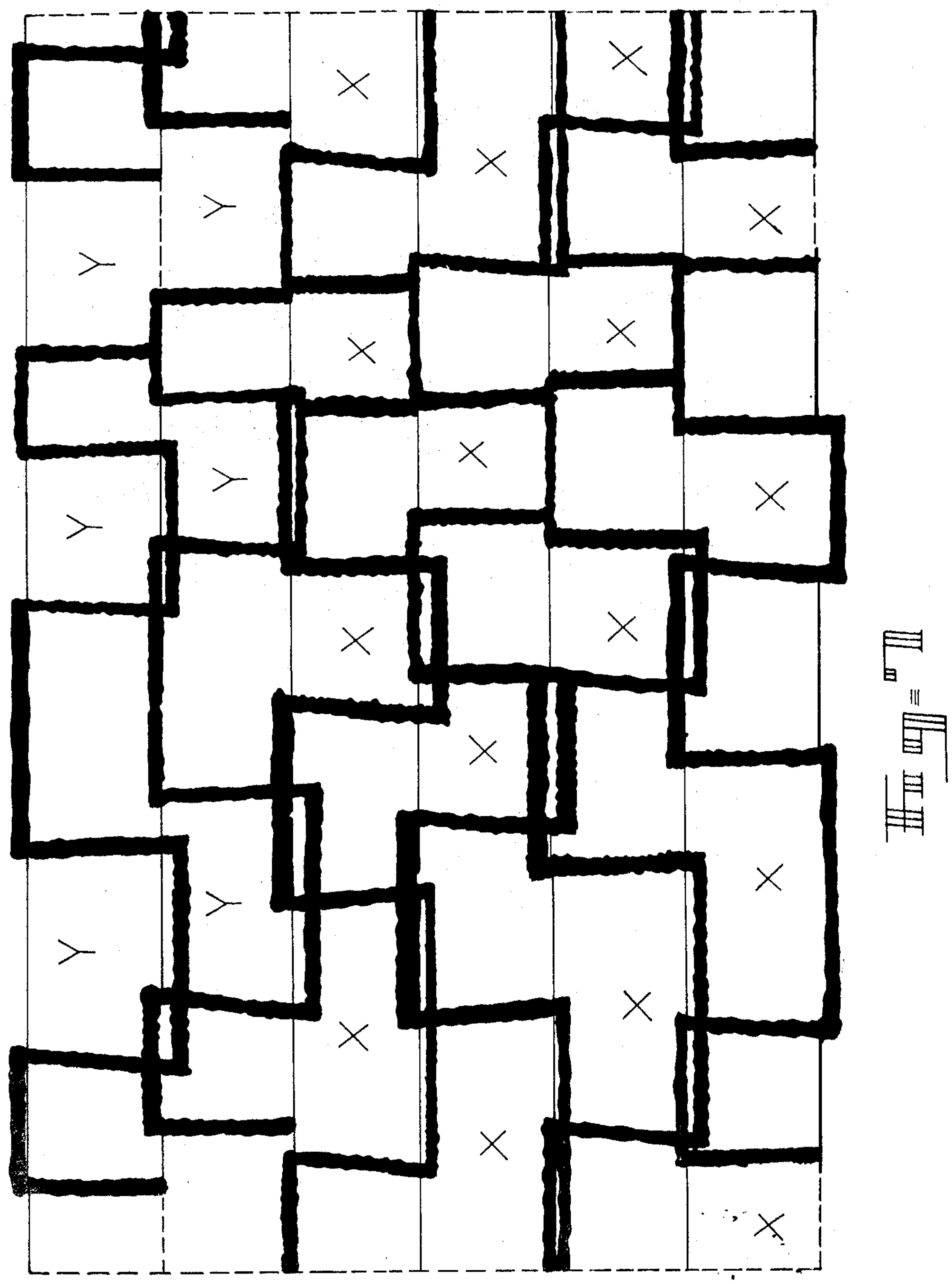
INVENTOR/S
ALBERT R. MORGAN, PAUL R. ANTOUN,
HOWARD E. CALLAHAN & THEODORE R. MAUGEL
BY Melville, Strasser, Foster and Hoffman
ATTORNEYS INVENTOR/S
ALBERT R. MORGAN, PAUL R. ANTOUN,
HOWARD E. CALLAHAN & THEODORE R. MAUGEL
BY Melville, Strasser, Foster and Hoffman
ATTORNEYS United States Patent Office 3,624,975

Patented Dec. 7, 1971

3,624,975

STRIP SHINGLE OF IMPROVED AESTHETIC CHARACTER

Albert R. Morgan, Paul R. Antoun, Howard E. Callahan, and Theodore R. Maugel, Cincinnati, Ohio, assignors to Panacon Corporation Filed Jan. 6, 1970, Ser. No. 973
Int. Cl. E04d *1/26, 1/36*
U.S. Cl. 52—105 19 Claims

ABSTRACT OF THE DISCLOSURE

A laminated, mineral-surfaced, asphalt strip shingle, which, when laid in courses on a roof, simulates the irregularity and attendant shadow effects found in wood shingles, while complying with Underwriters' Laboratories, Inc. standards for fire retardant asphalt shingles. A rectangular "monotab" base lamina and an "apron overlay" lamina are adhered together with roofing asphalt. The overlay lamina is of the same length as the base lamina and has a plurality of approximately rectangular tabs of varying widths and lengths, some of which project beyond the bottom edge of the base lamina, and is laterally offset with respect to the base lamina by a small amount, so as to cover the butt joint between adjacent base laminae in the same courses. Vertical alignment marks are provided, such that the base lamina overhangs the tops of the cut-outs between tabs of the overlay lamina in the next lower course. A plurality of horizontal laying marks, differently spaced, are provided to create a program in laying, which insures the avoidance of repetitive or directional patterning.

BACKGROUND OF THE INVENTION

There have been many attempts by the asphalt roofing industry to produce shingles that when applied on a roof would simulate the appearance of wood shingles. Reference may be made to the Wittenberg Pat. U.S. No. 2,178,273 (narrow, closely-spaced, sinuous strips of asphalt vertically overlaid on the surface of the shingle tab with a different color of granular mineral surfacing embedded in the overlay asphalt, to simulate wood grain). The MacNutt Pat. No. 2,170,534 also uses an overlay of asphalt and different colored granules, with irregular spaced outlines that are claimed to simulate wood grain, and adds a dark colored mineral surfacing along the upper edge of the shingle tab to provide a contrasting so-called "shadow band." The Croce Pat. No. 2,142,181 shows a similar, but simpler, construction without the shadow band. The Schuetz et al. Pat. No. 2,171,010 and the Leibrook Pat. No. 3,407,556 show strip shingle structures which attempt to solve the problem by providing exposed tabs of varying width and length so as to achieve a thatched shingle appearance when the shingles are applied on a roof.

While the shingles of the above patents do provide a more attractive, less regular and monotonous, appearance on the roof than that of the ordinary square butt strip shingle and some of them have had moderate commercial success, they all fall very far short of providing a close simulation of the characteristic appearance of a wood shingle roof. The reasons for this failure will become clear from the following discussion of the appearance characteristics of wood shingles.

The wood shingle roof is an American colonial tradition that is still strongly favored by many architects and home owners, particularly for application on any building which follows a pattern of colonial design. This continues to be true even though wood shingles have serious disadvantages, particularly their inherent high fire hazard and high application cost.

Undoubtedly the outstanding quality of a wood shingle roof to most viewers is the absence of any mechanical regularity and the presence of many "natural" variations of appearance which occur in different areas of the roof. By contrast, most asphalt shingle roofs exhibit such uniformity of tab dimensions, smoothness and color that they look "machine made" and monotonous.

The major reason for the characteristic non-regularity of wood shingle roofs is that each shingle is an individual unit which differs to some degree from adjacent shingles in width, thickness and length, even though most wood shingles are machine-sawed. These differences are even more pronounced in the larger, hand-split wood shakes.

Another cause of natural variation in the appearance of wood shingle roofs is the difference in the color and texture of the wood. Most of the wood shingles in the U.S. are produced from red cedar and with a small proportion cut from California redwood. The surface appearance of red cedar shingles varies in color, texture, grain, saw marks, etc., and especially with moisture content. Wood shingles absorb water readily and therefore such a roof looks quite different during and after rainfall than it does in dry weather. Since the homeowner knows that this is the nature of wood, the change in appearance is not usually considered objectionable.

The asphalt roofing industry has standardized to a large extent the dimensions of its major product—asphalt shingles—in the form of a 12" x 36" three-tab, square butt strip shingle having rectangular exposed tabs, each 5" x 12", so that each shingle course on the roof is exactly 5 inches wide ("exposure") and each shingle (tab) measures 12 inches. By far the greatest proportion of asphalt shingles produced are of this type, although large quantities of two-tab and monotab shingles are also produced.

Wood shingles offer a greater variety of dimensions, particularly as to the length of the shingle and the portion of its length exposed to the weather ("exposure"), plus the fact that each shingle varies in width and in thickness. The following Table of exposure lengths is based on Building Code standards for the application of wood shingles.

TABLE I.—MAXIMUM EXPOSURE TO WEATHER FOR WOOD SHINGLES

| Slope of roof, inches rise per horizontal foot | Shingle length, inches | | |
|---|---|---|---|
| | 16 | 18 | 24 |
| 3 to less than 4 | 3¾ | 4¼ | 5¾ |
| 4 to less than 5 | 4½ | 5¼ | 7 |
| 5 or more | 5 | 5½ | 7½ |

Wood shakes, as distinguished from wood shingles, are produced in lengths of 18", 24" and 32" and the exposure (width of each course) ranges from 5½" to 10", depending upon the length. Thus, they provide an even more massive and individual roof appearance than the smaller wood shingles.

Another important factor in the appearance of wood shingle roofs is the manner of application. Since each shingle is put in place individually and then nailed by the workman, it is very difficult to hold the course edges to a precise horizontal line, even when a chalk line or other course-alignment method is used. Generally, no such effort is made and quite often adjacent shingles are purposely spaced substantially above or below the course line to accentuate the appearance of irregularity. This contrasts with the precise tab edges and course-alignment devices with which asphalt strip shingles are provided.

As a result of several of the factors discussed above—particularly the variations in thickness and length, and deviations from a true horizontal course alignment—wood shingle roofs have a unique appearance characteristic which may be termed a "variable shadow effect." This effect greatly accentuates the lack of mechanical regularity in the over-all appearance of the roof. Another condition which often further reinforces the shadow effect is the upward warping or curling which frequently occurs along the butt edges of some of the wood shingles. A warped shingle casts a wider shadow along the butt edge than does a shingle which lies flat upon the underlying course.

Where two adjacent wood shingles in the same course differ in thickness, the thicker shingle will cast a shadow along the vertical edge of the thinner shingle. This shadow may be strong or weak, depending on the difference in thickness, intensity of sunlight, slope of the roof, time of day (sun angle), and position of the observer. Under most conditions this shadow effect emphasizes the variations and lack of regularity of the shingles. The same is true of the shadows produced along the butt edges of the shingles in each course especially where adjacent shingle butt edges deviate from a true horizontal course line and one shingle projects beyond the other.

It is well known that wood shingles change in appearance as a result of weather exposure on a roof. The effects of intermittent wetting and drying, erosion of wood fibers from the surface, extraction and washing away of coloring substances naturally present in the wood, bleaching by actinic light of the sun, tend generally to make the shingles appear more gray and characteristically "weather beaten" after a few years of exposure. Offsetting these bleaching effects there may be staining of the wood in some areas by dripping of sap from trees, air borne soot and dirt, or surface growth of fungus or moss in warm, damp climates. Generally, the part of a roof area which is sheltered by a tree will have an appearance quite different from areas open to the sun.

Wood shingles, unless specially treated for fire-resistance, involve a very serious fire hazard, whereas all asphalt singles produced in this country qualify for an Underwriters' Laboratories, Inc. Class C fire retardant rating. Asphaltic composition shingles are also produced that qualify for a U.L. Class B (higher) or for a U.L. Class A (highest) fire retardant rating. Recently, some pressure-impregnated wood shingles have qualitfied for U.L. Class C, but this treatment involves substantially higher cost. Consequently nearly all of the wood shingles being sold and applied in the U.S. are of untreated wood.

The Bel Air (Los Angeles) conflagration of November 1961 caused the destruction of over 500 homes and other buildings, with an estimated total loss of $30,000,000, the greatest residential area conflagration in the entire history of the North American continent. The National Fire Protection Association's investigation of this conflagration placed as first in importance among the contributing causes—"the hazardous nature of wood shingles and shakes"—which caused roof fires to spread rapidly from one building to others in the area.

Wood shingles offer an extremely limited range of colors, in contrast to asphalt singles where a wide range of permanent colors and blends in variegated patterns are available. Attempts to provide wood shingles with colors other than that of the natural wood have not proven satisfactory, for example, by staining the wood with organic dyes. These dyes are not sun-fast and bleach out on exposure, also the action of rainfall dissolves or disperses the dye so that it washes out unevenly from the wood. The result is loss of part of the original color and a disagreeable, uneven residual color. The colors of asphalt shingles are provided by permanent mineral pigments ceramically coated on mineral granules embedded in the asphalt coating and these granules retain substantially their original color during long years of weather exposure.

BRIEF SUMMARY OF THE INVENTION

The primary purpose of this invention is to provide an asphaltic composition strip shingle that may be applied by the workman in the usual manner in horizontal, vertical or diagonal courses on the roof and which, when so applied, results in an overall appearance having the slight irregularity and "natural" variations in dimensions that are characteristic of a wood shingle roof.

Another object of the invention is to provide an asphalt shingle roof covering that simulates very closely the variable natural shadow effects which occur on wood shingle roofs, by making structural arrangements of the shingle parts which actually cast similar shadows.

A further object is to provide the strip shingle of this invention with both vertical and horizontal alignment marks or notches as guides for the workmen in applying the shingles in courses on the roof, to ensure correct placement that will produce natural shadows along the lower edge of each course and that will avoid the appearance of any repetitive or directional patterning of the tabs in any area of the roof.

It is also an object of this invention to produce an asphalt strip shingle that is highly leak resistant by constructing the shingle in laminated form so arranged that the overlay lamina provides a cover for the abutting end edges of the base laminae of the shingles as laid in a horizontal course on the roof. Also, to produce a shingle that resists blowing up of the tabs in the wind.

A general object of this invention is to provie an asphalt shingle roof covering that closely simulates the appearance of a wood shingle roof, but also has the inherent advantages of higher fire resistance, long weathering life and excellent retention of its original appearance after long periods of weather exposure, being free of the deterioration of appearance resulting from weathering that is characteristic of wood shingles.

BRIEF DESCRIPTION OF THE DRAWINGS

FIG. 7 is a diagrammatic fragmentary plan view of several courses of the laminated shingles as applied on a roof showing by exaggerated black lines or bands the areas where natural shadows will be cast on adjacent areas, i.e. along the vertical edges of the overlay tabs, beneath the projected butt edges of the overlay tabs, and beneath the projected lower edge of the base lamina (monotab) between the tabs.

DETAILED DESCRIPTION OF THE INVENTION

Figure 1:
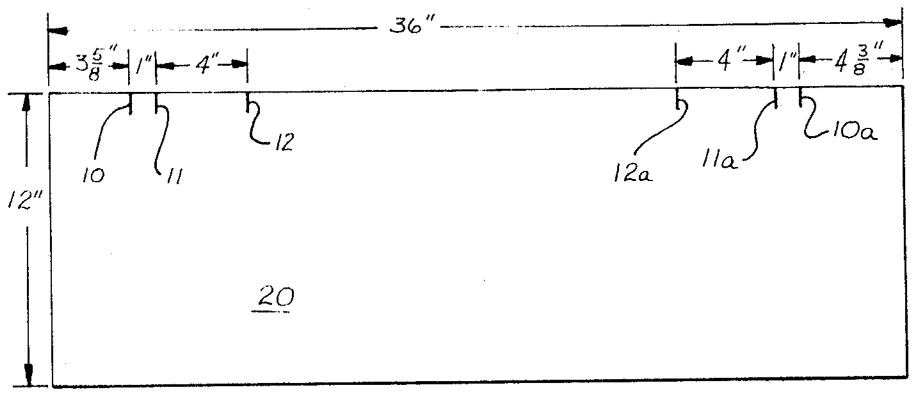
FIG. 1 is a plan view of a "monotab" shingle of mineral-surfaced asphalt roofing, constituting a base lamina.

To achieve the several purposes of this invention it has been found desirable to construct the strip shingle in laminated form, with a unitary base lamina or "monotab" shingle of the full length dimension of the strip and with no tab cut-outs. Laminated to this base lamina is an overlay or "apron lamina" of similar roofing sheet material of the same length as the base. This apron overlay may be of narrower width, and has multiple, widely-spaced cut-out tabs of rectangular or approximately rectangular shape, each of different width and length, and is adhesively laminated to the base, preferably with roofing asphalt. The apron overlay is positioned upon the base so that preferably at least one of the tabs has a side edge parallel with the end edge of the base and with its lower edge coinciding with the lower edge of the base lamina; the apron overlay also has at least one tab which extends substantially beyond the lower edge of the base lamina to form a projecting ledge. The surface areas of the base lamina exposed in the spaces between the tabs of the overlay become tab-simulating areas of the composite strip shingle when it is laid on the roof. The tabs of the apron overlay are so spaced that the tab-simulating areas between the tabs also differ from each other in width.

It is evident that the novel laminated shingle arrangement above described has structural relationships that enable a roof covering of these shingles to achieve the characteristic irregularity and shadow effects of a wood shingle roof. The tabs and the tab-simulating areas between the tabs are at different surface elevations and provide the visual effect of adjacent shingles having different thicknesses. The overlay tabs of different width and length, in combination with the tab-simulating areas of the base lamina exposed between the tabs, each of different width give the irregular appearance of a course of shingles of varying width and length. Since one or more tabs extend below the edge of the base lamina this makes the course edge appear slightly irregular, as it actually is; and this effect may be enhanced by angular or irregular cutting of the bottom edges of the tabs. Also, the extended lower portion of the tab forms an overhung ledge that casts a natural shadow beneath and along the upper edge of the underlying course of shingles. In sum total, this new laminated shingle as applied on a roof results in an over-all appearance of natural irregularity of width and length of the shingles, irregularity of the horizontal course line, and it casts natural shadows along the vertical edges of the tabs and along the lower edge of each overlying course.

While maintaining the basic structural arrangement of the shingle parts as described above, various modifications have been discovered that enhance the appearance of natural irregularity and the shadow effects of the shingles as applied on a roof.

For practical purposes of handling on the roofing machine, packaging, shipment and application, it is desirable that the shingle dimensions should conform generally to the dimensions of the asphalt strip shingles which constitute the industry's major volume product, namely, 12" x 36" strips. However, laminated strip shingles employing the features herein disclosed can, of course, be produced in other dimensions as to width and length, within the limits of practical handling in manufacture and application, and such shingles will have similar appearance advantages in respect to irregularity and shadows and will simulate wood shingle roof covering when applied.

It will of course be understood that a 12" x 36" size has been selected because this is presently the standard in the roofing industry, but that 48" or 60" or even 72" lengths could be used. With longer strip shingles, the number of tabs per shingle will be increased, making possible a greater variation in individual tab configurations, and at the same time reducing the number of shingles per square.

When the laminated strip shingle is to be produced to approximate 12" x 36" dimensions, the number of tabs of the "apron overlay" lamina may range from two to four, but a three-tab overlay is considered preferable. Shingles made with two-tab overlay will give the general effect of wide wood shingles which some architects may prefer. The four-tab overlay will give the general effect of quite narrow wood shingles which is less desirable. A three tab overlay on a 36" long strip can be arranged to have both wide and narrow tabs so that when applied on a roof the general appearance is that of a mixture of shingles of varying width, so characteristic of wood shingle roofs.

Figure 3:
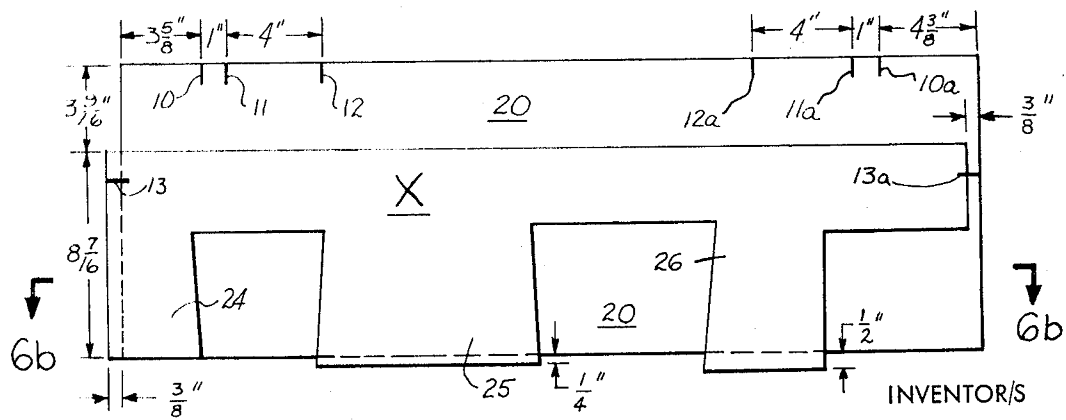
FIG. 3 is a plan view of the assembled laminated strip shingle, with apron overlay X adhesively secured to the base lamina (monotab). The positions of vertical and horizontal alignment marks for laying the shingles are shown.
Figure 4:
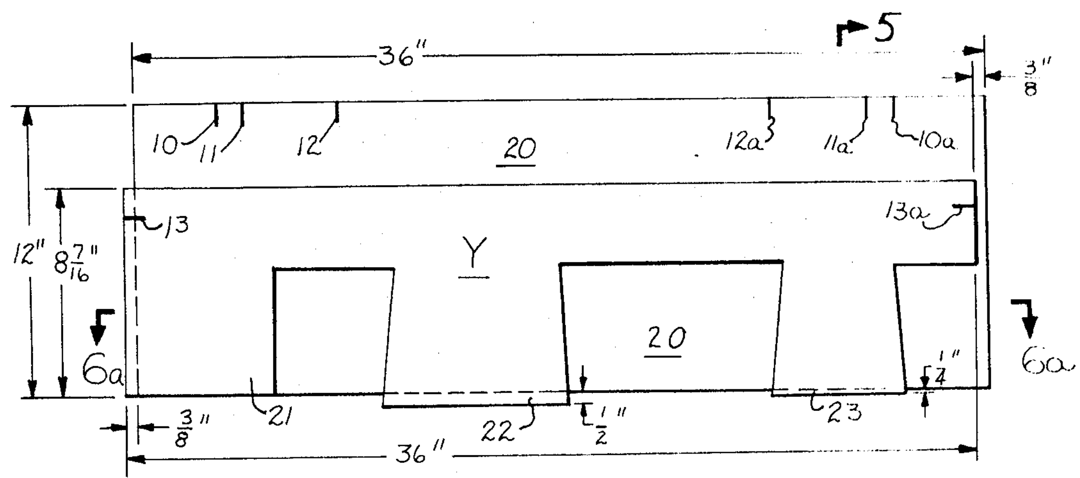
FIG. 4 is a view similar to FIG. 3, but with apron overlay Y adhesively secured to the base lamina.

The shingle tabs of the "apron overlay" lamina have been described as rectangular or approximately rectangular. It is preferred that at least one tab (preferably the left end tab of the overlay) have a side edge at a 90° angle to its lower edge and with its lower edge coinciding (flush) with the lower edge of the base lamina, which assists the workmen to align the shingles properly in a horizontal course. However, it has been discovered that the desired appearance of natural irregularity can be greatly enhanced by making the side edges of some of the tabs deviate slightly from a true rectangular shape, so that the top width of the tab is somewhat less than that of the lower, exposed edge. When the overlay lamina that has had the tabs thus modified is applied to the base lamina this results in making the tab-simulating areas of the base exposed between the overlying tabs also deviate from a true rectangular shape in a complementary manner, so that these exposed areas have a top width greater than that of their lower, exposed edge, as shown in FIGS. 3 and 4. The deviations of the tab side edges from true rectangular are preferably in the range of 2° to 8° and should not exceed about 10°, beyond which an undesirable angular appearance of the tabs develops. A deviation of less than 2° from the vertical can hardly be detected by the human eye and, although not objectionable, would not contribute appreciably to the desired appearance effect of irregularity.

Figure 2:
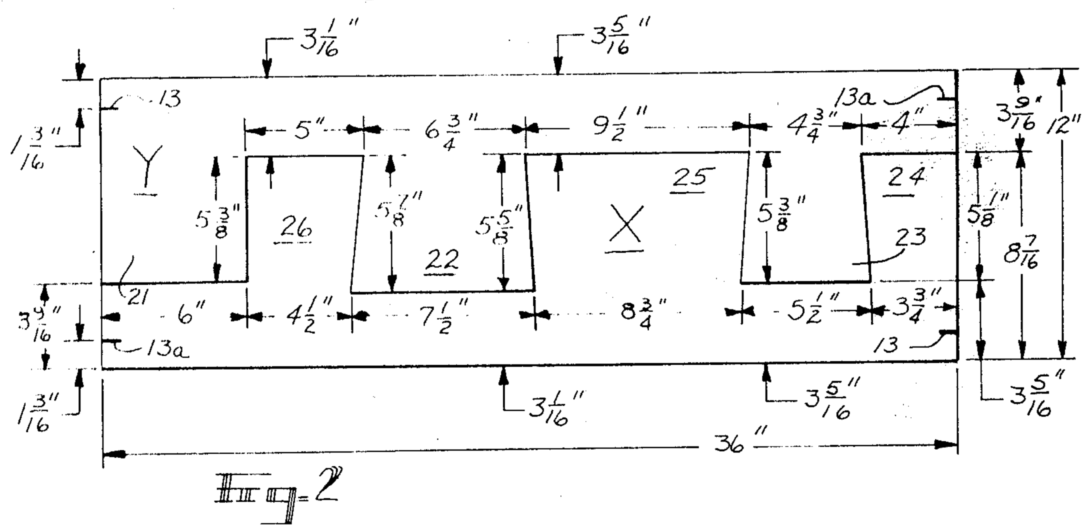
FIG. 2 is a plan view showing the cutting pattern for the overlay laminae—two complementary interlocking tab, mineral-surfaced roofing strips—conveniently termed "apron overlays." The complementary apron overlay strips may be designated X (male) and Y (female) for purposes of reference in the description.

Since the base lamina "monotab shingle" provides complete weather protection for the roof, the overlay "apron lamina" need not be the full width of the base strip, which would unnecessarily increase the weight and cost of the laminated shingle. Thus, the overlay lamina may be produced by cutting two complementary, interlocking-tab apron overlays on the roofing machine from a sheet of shingle roofing material of the same width as the base lamina, as shown in FIG. 2. This results in two "apron overlays" X and Y, each of which has individually different tab widths and lengths, with one end tab rectangular and the other tabs nearly rectangular but with slightly deviated side edges. When laminated with the base, overlay X produces a laminated shingle having different tab and tab-simulating area dimensions and appearance from that produced by overlay Y, that is, the manufacturing operation produces equal quantities of two different laminated shingles. Thus, it can be observed that in the preferred cutting pattern (FIG. 2) not only do all the tab dimensions and tab-simulating area dimensions differ from each other in overlay X and all the corresponding dimensions differ from each other in overlay Y, but also all the corresponding dimensions of X differ from those of Y.

If all the shingles laid on a roof have been made with the X overlay, the apparance will be slightly different from that obtained with shingles made with the Y overlay, due to the differences in dimensions of the tabs and tab-simulating areas of X and Y, although both roofs will have the characteristic non-regularity and shadow-producing behavior of a wood shingle roof. If X and Y overlay shingles are pre-mixed in approximately equal proportions it becomes substantially impossible to detect any differences or repetitive patterns of tabs in different areas of the roof, when the shingles are laid at random as taken from the packages.

Pre-mixing or sorting of X overlay shingles and Y overlay shingles is not absolutely necessary, however, by reason of the special course programming that has been built into the shingles as an integral feature. Thus each shingle, both of X and Y overlay construction, has along the upper edge at each end of the base monotab lamina a predetermined sequence of three laying marks (slits or notches) indicated at 10, 11, 12 and 10*a*, 11*a* and 12*a*, so spaced that each succeeding course is offset by a different measured distance from the preceding course. Four courses are laid according to this programmed schedule and then the cycle is repeated with the following four courses and so on until the roof has been completely covered. Using this programmed control of the course laying, it has been found that no repetitive or directional patterning of the tabs can be observed, regardless of whether all X overlay or all Y overlay, or a mixture of the X and Y shingles, are applied. Even if the program is not carefully followed, it will be extremely difficult to detect any patterning of tabs.

To further reinforce the shadow effect along the course edge the shingle is preferably modified by providing on each edge a vertical alignment mark (notch or slit) 13, 13*a* as shown in FIG. 3 and FIG. 4. When the course is laid to this alignment mark the result is that the lower edge of the monotab lamina overhangs the top lines of the cut-out spaces of the apron overlay lamina (the tab-simulating areas) of the shingles of the underlying course, as clearly shown in FIGS. 8*a* and 8*b*. Depending on the tab and cut-out dimensions the extent of the overhang may vary from ⅛ inch to as much as ⅝ inch. These overhung edges of the base lamina form additional horizontal ledges between the tabs, beneath and along which a natural shadow will be cast by the sun. In the preferred embodiment of the invention this additional shadow-producing feature is included. It may be noted that when the shingles are thus laid, the average exposure is slightly reduced. Thus for 12″ x 36″ strip shingles the exposure will be about 4⅞″ and the headlap 2¼″. Ordinary 12″ x 36″ asphalt strip shingles are laid with 5″ exposure of the tabs which provides a 2″ headlap. The ASTM definition of headlap is: "The minimum distance measured at 90 deg. to the eave along the face of a shingle as applied to a roof, from the upper edge of the shingle to the nearest exposed surface (of the deck)."

A further improvement in this new shingle, which is made possible by its laminated construction, is to use the overlay lamina to provide a cover or rabbet for the end joints between abutting shingles so as to minimize leakage of water through these joints. This is accomplished by shifting the overlay lamina laterally on the base lamina by at least about 3/16 inch, and up to about ½ inch, as shown in FIG. 3 and FIG. 4. Thus, when the shingles are applied in a course, the projection of the overlay lamina at the left end completely covers the vertical joint between adjacent shingles up to the top line of the overlay. This is the preferred construction and provides a roof covering that is highly leak-resistant. Also, the top strip portion of the overlay lamina provides a barrier to the passage of water upwardly over the headlap area of the shingles when they are subjected to wind-driven rain.

Inherent in the laminated construction of the shingle with a unitary base and an overlay of cut-out tabs is a substantial difference in surface elevation between the tabs and the cut-out spaces where the base is exposed between the tabs. When the shingles are in place on the roof these areas between the tabs also appear to be tabs or shingles, but of lesser thickness than the tabs, and may correctly be designated tab-simulating areas. In some cases it may be found desirable to reinforce the visual differentiation between the tabs and the adjacent tab-simulating areas by modifying the surface texture of one or the other, or even both, to emphasize the difference in elevation and apparent thickness. Thus, the area of the base lamina exposed between the tabs might have the mineral granule surfaced asphalt coating embossed or "textured" with narrow, closely-spaced vertical lines while the tabs would remain smooth, or vice versa. This would provide some degree of contrast between these adjacent areas by reason of the alteration of the surface texture by embossing, even where both areas have been surfaced with the same color of granules. Another expedient would be to emboss the tabs with one kind of texture, such as narrow, closely-spaced lines, and the tab-simulating areas with a different texture, such as more widely-spaced straight or curved lines. Additionally, the tabs may be provided with granule surfacing of one size grading, while the tab-simulating areas of the base lamina may be provided with granule surfacing of a different size grading. Similarly, granules of one color may be used on the tabs, and granules of a different color on the tab-simulating areas of the base lamina, and again these different colored granules may be of the same or different size grading. It is readily apparent that many variations of textured and non-textured surfaces could be employed to accentuate the differences between these adjacent areas of the shingle.

Figure 9:
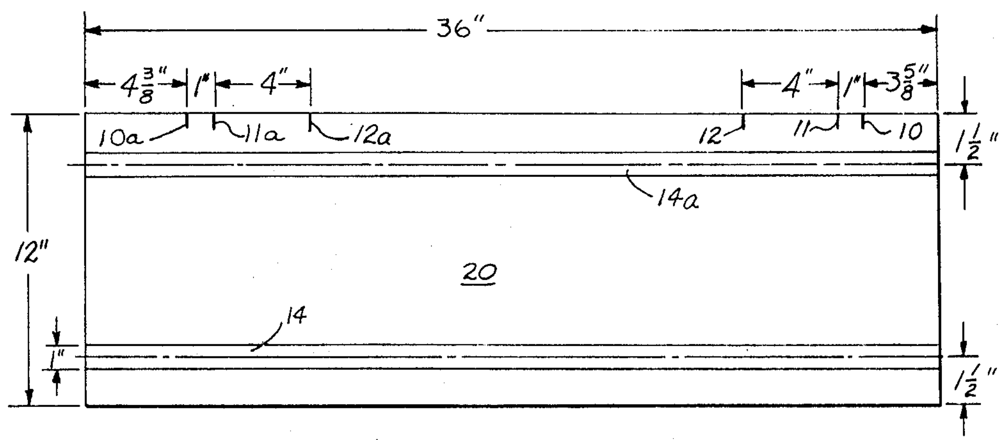
FIG. 9 is a plan view of a shingle according to FIG. 3 or FIG. 4 from the reverse side, showing a strip of self-sealing adhesive which becomes activated by the heat of the sun after the shingles have been applied on the roof, and makes them resistant to blowing up in the wind, and also the release tape which prevents the shingles from sticking together in the package.

In the preferred embodiments of the invention the shingles are also provided with a "seal down" feature, such as a strip of asphalt adhesive on the reverse side as shown in FIG. 9, with a release tape 14 that prevents sticking in the package. This adhesive, when activated by the heat of the sun, seals the shingles to those in the underlying course and prevents blowing up in the wind. Thus, the tabs are adhesively sealed to the base lamina and the entire laminated shingle is adhesively sealed to the shingles of the underlying course, which makes this shingle roof covering highly wind-resistant. The location of the asphalt adhesive strip and of the release tape may be altered from that shown in FIG. 9, for convenience in manufacture, packaging and application of the shingles.

TYPICAL EXAMPLE OF THE INVENTION

This invention is not limited to any particular asphaltic roofing composition, but it is desirable that the shingles should meet at least the minimum requirements as to composition, quality and fire-retardant test performance of Underwriters' Laboratories, Inc. Standard UL 55B (1962) for Class C Asphalt Roofing and Shingles, A.S.T.M. Standard D225–62, and the Federal Specifications for Asphalt Shingles, all of which have identical requirements. If desired, the new shingle can be produced to meet still higher fire-retardant ratings, namely, Underwriters' Laboratories Class B or Class A, by using a special fire-resistant asphaltic coating composition such as disclosed in the Fasold et al. Patent No. 2,326,273. The shingles of the typical example of this invention as herein described were produced in accordance with the above designated Underwriters' Laboratories, Inc., A.S.T.M., and Federal Specification Standards.

Figure 8A:
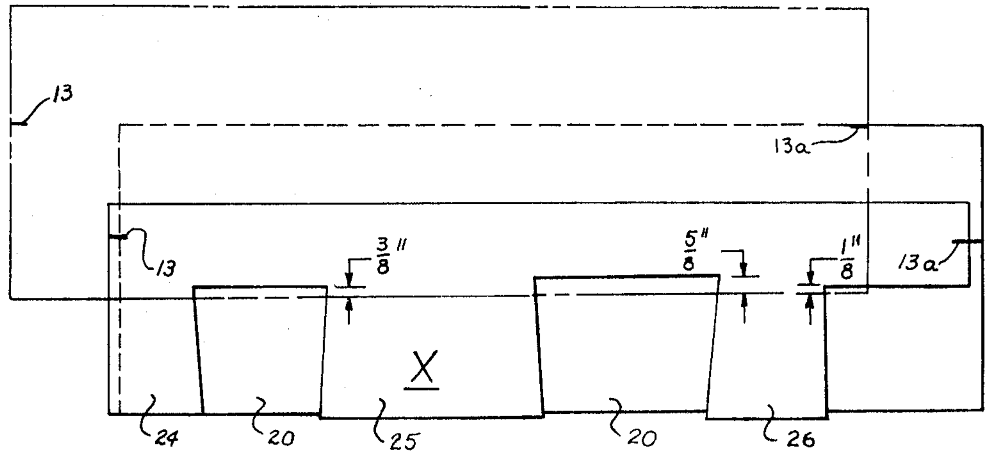
FIG. 8A is a plan view of a laminated shingle according to the invention with overlay X, showing in rectangular outline, the position of an overlying shingle demonstraing how the butt line of the overlying shingle overhangs the cut-outs in the apron lamina of the underlying shingle.
Figure 8B:
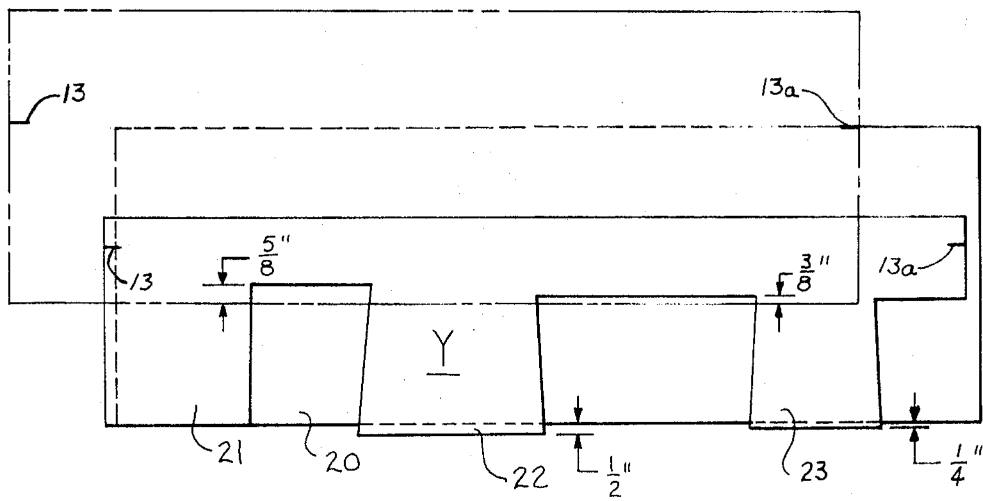
FIG. 8B is a view similar to FIG. 8A but showing a laminated shingle with overlay Y.

The dimensions of the parts and the manner of their assembly to produce laminated shingles of a typical example of the preferred embodiment of this invention are shown in FIG. 1 to FIG. 4, inclusive, FIGS. 8A and 8B, and FIG. 9. FIG. 1 shows the base lamina or "monotab" shingle 20, cut 12" x 36", which is produced on the roofink machine from mineral granule surfaced asphalt shingle sheet in the usual manner, using nominal 55 lb. dry felt, asphalt saturant and coating, and granules, and weighing about 98 lb. per 100 square feet. This monotab shingle is a unitary sheet with no tab cut-outs and could be applied on a roof as a shingle covering (5" exposure and 2" headlap), without any laminated overlay, to meet Underwriters' Laboratories Class C Standard. Except for its monotonous appearance it would provide a satisfactory roof covering. Along the upper edge of the "monotab" base lamina at each end are shown three horizontal alignment marks or slits for the programmed four-course schedule of application of the shingles, as described above. These marks are spaced 4⅜", 5⅜" and 9⅜" from the right end, as indicated at 10*a*, 11*a*, and 12*a*, and 3⅝", 4⅝" and 8⅝" from the left end, as indicated at 10, 11 and 12.

In FIG. 2 are shown the machine cutting pattern and dimensions for the overlay lamina X (male) and the complementary overlay lamina Y (female), both of which are cut as interlocking tab strips from a single sheet of shingle roofing material, 12" x 36". Each overlay is 8 7/16" x 36" and has three tabs and three cut-out spaces, each of different width and length. Overlay lamina Y has tabs 21, 22 and 23, of widths, at the bottom edges, of 6", 7½" and 5½" and the tab lengths range from 5⅛" to 5⅞". The widths of the spaces between the tabs of overlay Y are 4½", 8¾" and 3¾" at the bottom edges. Depending on the dimensions of the tabs and cut-outs, the width of the top strip from which the tabs depend varies from 3 1/16" to 3 9/16". It will be observed that the left end tab of overlay Y is rectangular and that each of the three tabs is different in shape and dimensions. Also, each of the cut-out spaces differs in shape and dimensions from the other cut-outs and from each of the tabs.

Overlay lamina X shows similar relationships of tab and cut-out space dimensions, and it will be observed that the cut-outs of overlay Y constitute the tabs of overlay X. The tabs of overlay X are indicated at 24, 25 and 26, and their widths at the bottom edges are 4", 9½" and 5" and the tab lengths range from 5⅛" to 5⅞". The widths of the spaces between the tabs are 4¾", 6¾" and 6". The left end tab 24 of overlay X (right end as seen in FIG. 2) has its left hand edge at a 90° angle to its lower edge, each of the three tabs is different in shape and dimensions, and each of the cut-out spaces differs in shape and dimensions from the other cut-outs and from each of the tabs. Summing up, all of the tabs of both X and Y are different in shape and dimensions, although all of them are of approximately rectangular form; all of the cut-out spaces of X and Y are also different in shape and dimensions and of approximately rectangular form. As shown in FIG. 2 the deviations of the side edges of the tabs from a true 90° angle to the lower edges is small, in the range of 2° to 8°.

For the mineral surfaced asphalt shingle sheet from which the overlays are to be cut, it would be possible to use the same material composition as for the base lamina, as above described. However, it has been found advantageous to use a roofing sheet with a greater proportion of coating asphalt and mineral surfacing granules and less asphalt-saturated felt, as this improves the long-term weather durability of the exposed tabs. Thus, the preferred embodiment of the novel laminated shingle uses for the overlay lamina a special roofing sheet made on a 40 lb. dry felt, saturated and coated with asphalt, with mineral granules embedded in the coating layer, and weighing about 82 lb. per 100 sq. ft. This special roofing sheet contains a combined weight of asphalt coating and mineral granules (the weather-resisting materials) over 2½ times the weight of the non-weather-resistant saturated felt, which is primarily a carrier or base for the asphalt coating and mineral surfacing materials.

The overlay lamina and the monotab base lamina are assembled and combined with an adhesive asphalt of character similar to the coating asphalt, using apparatus and methods well known in the industry and which need not be described in detail.

FIG. 3 and FIG. 4 show the dimensions and the assembly arrangements for the laminated shingle, both for Overlay X (FIG. 3) and Overlay Y (FIG. 4). The vertical alignment marks or slits are also shown, one at each end of the shingle 1 3/16" below the top edge of the overlay. Reference to FIGS. 8A and 8B show how these vertical alignment marks position successive courses so that the lower edge of the base lamina overhangs the tops of the cut-out spaces in the overlay lamina of the underlying course of shingles, by from ⅛" to ⅝". The lateral offsetting of the overlay lamina by ⅜" to provide a cover for the vertical abutting end joints of the shingles is also shown.

From the examination of FIG. 3 and FIG. 4 it is readily apparent that each of these laminated 36" strip shingles creates an appearance effect of having six tabs (3 overlay tabs and 3 tab-simulating spaces between the overlay tabs), each of which is of different shape and dimensions. In place on the roof it appears that there are two wide tabs, two tabs of intermediate width and two narrow tabs. When shingles with overlay X are applied on the same roof with shingles made with overlay Y, this introduces a still greater variety of tab dimensions as to width.

As to the overhang of the tabs below the lower edge of the base lamina (FIGS. 8A and 8B) it will be observed that one tab has no overhang and that the two other tabs overhang by different distances, ¼" and ½". Also, for overlay X the arrangement of overhang tabs is reversed from that for overlay Y so that the order along the lower edge is different. It is evident that this increases the visual impression of random irregularity of the course edges when the shingles are applied, especially when both X and Y overlay shingles are applied on the same roof.

The laminated shingles of the typical example of this invention, above described, require 84 shingles per square (100 sq. ft. of roof area covered) and weigh about 350 lb. per square. A strip of self-sealing asphalt adhesive 14 on the reverse side, centered 1½" from the lower edge of the base lamina, (FIG. 9), and a release tape 14*a*, 2" wide, centered 1½" from its upper edge, enable the shingles to be packaged so that they do not stick together in the bundle. The shingles are applied on the roof with an average 4⅞" exposure and 2¼" headlap. They qualify for an Underwriters' Laboratories Class "C" Wind Resistant label.

Figure 5:
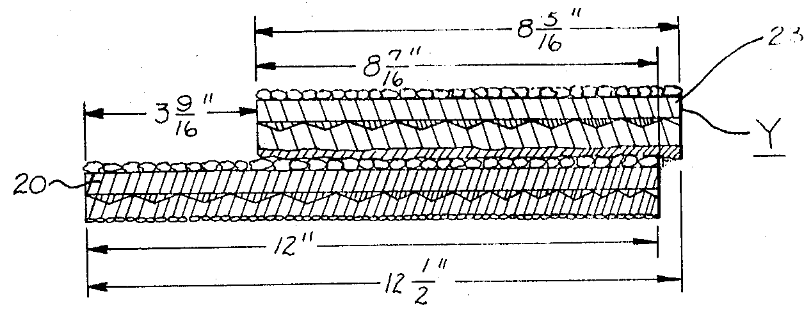
FIG. 5 is an enlarged cross sectional view of the laminated shingle, taken along the line 5—5 of FIG. 4, parallel to the end edge of the strip and through the tab portion of the apron overlay, showing extension of the overlay tab beyond the lower edge of the base lamina (monotab).

Figures showing variable shadow-producing effects resulting from the novel structural arrangement of the shingle parts FIG. 5 shows the extended lower edge of the tab beyond the butt line of the base lamina. This extended ledge or overhang casts a natural shadow along the butt line of the shingle course.

Figure 6A:
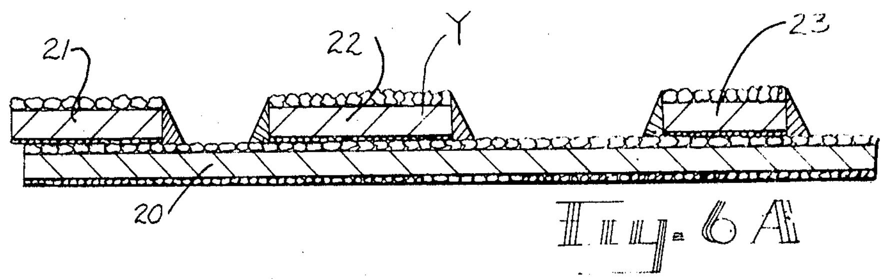
FIG. 6A is an enlarged cross sectional view taken on the line *6a—6a* of FIG. 4 of the laminated shingle with overlay Y, cut along a line parallel to the upper (horizontal) edge of the strip, through the exposed area of a shingle as applied on a roof, showing differences in elevation of the surface planes of both the overlay (tab) lamina and of the base lamina areas between the tabs, indicating the locations where shadows will be cast along the vertical edges.
Figure 6B:
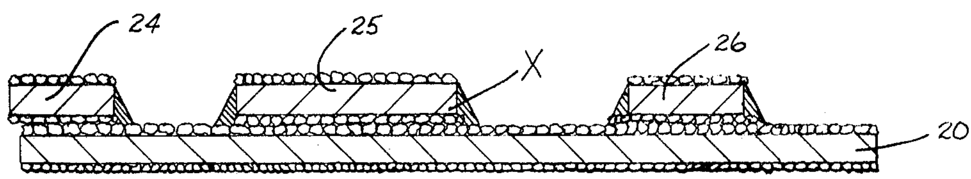
FIG. 6B is a view similar to FIG. 6A but with overlay X, and taken on the line *6b—6b* of FIG. 3.

FIGS. 6A and 6B show the locations at the edges of each overlay where shadows will be cast along the vertical edges of each tab.

FIG. 7 illustrates schematically by heavy lines or bands the locations where natural shadows will be cast—along the vertical edges of the overlay tabs, beneath the extended lower tab edges, and beneath the overhung base lamina between the tabs, depending upon the position of the sun and the viewer. It is of course evident that these shadows do not appear in a fixed pattern such as shown in the schematic drawing, but vary with many factors, including the time of day, intensity of sunlight, angle of the sun, slope of the roof and position of the observer. The shadows are variable in the same way that is characteristic of natural shadows on a wood shingle roof. FIG. 7 summarizes the structural arrangements of the shingle parts that are shown in FIG. 5, FIGS. 6A and 6B, and FIGS. 8A and 8B, and shows all the areas where shadows may be cast. While the construction described herein is that of a laminated strip shingle having two laminae of asphalt composition shingle material, it is obvious that the strip shingle need not necessarily be of laminated construction nor of conventional asphalt shingle composition, to achieve the desired structural and visual relationships.

It is believed that the foregoing constitutes a full and complete disclosure of the invention but no limitations are to be implied except insofar as specifically set forth in the claims which follow.

The embodiments of the invention in which an exclusive property or privilege is claimed are defined as follows:

1. A strip shingle consisting of a unitary mineral granule surfaced asphalt shingle without tab cut-outs as the base lamina, and overlying said base lamina a mineral granule surfaced asphalt shingle overlay having multiple, widely spaced cut-out tabs of generally rectangular shape and of different widths and lengths, said overlay lamina being adhesively secured to said base lamina, the spaces of the base lamina exposed between said tabs being tab-simulating areas when the shingle is laid on a roof, said overlay lamina being positioned on said base lamina so that at least one of said tabs extends substantially beyond the lower edge of said base lamina to form a projecting ledge, and at least one of said tabs has its lower edge coinciding with the lower edge of the base lamina, said composite laminated strip shingle being adapted for application on the roof in the usual manner to provide a shingle roof covering that closely simulates the irregular appearance of a wood shingle roof.

2. A laminated composition strip shingle according to claim 2, wherein all of said tabs extend beyond the lower edge of said base lamina by different amounts.

3. A laminated strip shingle according to claim 1, in which the overlay lamina has at least three tabs and the lower edge of the left end tab coincides with the lower edge of the base lamina and each of the other tabs extends beyond the edge of the base lamina by a different distance.

4. A laminated strip shingle according to claim 1, wherein the lower edges of some, at least, of said tabs are nonrectilinear.

5. A laminated strip shingle according to claim 1, in which the base lamina is about 12 inches wide and from 36 to 72 inches long and the overlay lamina has at least two, and not more than eight tabs.

6. A laminated strip shingle according to claim 1, in which a side edge of one or more of said overlay tabs deviates appreciably from a line drawn vertical to the lower edge of said tab, and the left edge and lower edge of the left end tab are rectangular.

7. A laminated strip shingle according to claim 1, in which the overlay lamina is offset laterally by at least 3/16 inch, providing a cover for the abutting end joints of adjacent shingles in the course when they are applied, to prevent leakage of water through the joint.

8. A laminated strip shingle according to claim 2, in which the dimensions of the exposed area of each tab differ from the dimensions of the other tabs and the dimensions of the tab-simulating areas between said tabs also differ from each other and from each of the tab dimensions, to provide a random, irregular tab appearance when the shingles are applied in courses as a roof covering.

9. A laminated strip shingle according to claim 2, in which the dimensions of the exposed area of each tab differ from the dimensions of the other tabs and the dimensions of the tab-simulating areas between said tabs also differ from each other and from each of the tab dimensions, and the side edges of at least two of said tabs deviate 2° to 8° from a line drawn vertical to the lower edges of said tabs.

10. A laminated asphalt composition strip shingle consisting of a unitary mineral-granule-surfaced asphalt strip shingle without tab cut-outs as the base lamina, and overlying said base lamina a mineral-granule-surfaced asphalt shingle overlaying lamina of the same length but narrower width, having widely spaced cut-out tabs of approximately rectangular shape and of different widths and lengths, said overlay lamina being adhesively secured to said base lamina by a weather resistant adhesive, the spaces of the base lamina exposed between said overlay tabs being tab-simulating areas when the shingle is laid on a roof, the left end tab of said overlay having its left and lower edges rectangular and its lower edge positioned flush with the lower edge of the base lamina, the remaining tabs each extending a different distance beyond the lower edge of the base lamina to form projecting ledges of different width, the side edges of said extended tabs deviating by 2° to 8° from a line vertical to the lower edges of said tabs, said overlay lamina being shifted laterally by at least 3/8" from the end edge of the base lamina to form a cover for the end joints of adjacent shingles in a course, said laminated strip shingle having vertical alignment marks at each end below the top edge of the overlay so positioned that the lower edge of the base lamina overhangs the cut-out spaces between the tops of the tabs of the shingles of the underlying course when laid, said laminated strip shingle also having three horizontal laying marks at each end of the top edge to provide a four-course cycle for offset laying of successive courses of shingles whereby repetitive or directional patterning of tabs is avoided, said laminated strip shingles when thus laid providing a close simulation of the overall irregular appearance and natural shadow effects of a wood shingle roof.

11. A laminated asphalt composition strip shingle according to claim 10, in which the surface texture of the granule surfaced coating layer of the exposed tabs of the overlay lamina has been altered by embossing with vertical lines and the tab-simulating areas of the base lamina exposed between said tabs are smooth.

12. A laminated asphalt composition strip shingle according to claim 10, in which the exposed tabs of the overlay lamina are provided with a granule surfacing of a different size grading than the tab-simulating areas of the base lamina exposed between said tabs.

13. A laminated asphalt composition strip shingle according to claim 10, in which the exposed tabs of the overlay lamina are provided with a granule surfacing of a color different from that of the granule surfacing of the tab-simulating areas of the base lamina exposed between said tabs.

14. A laminated asphalt composition strip shingle according to claim 10, in which the exposed tabs of the overlay lamina are provided with granule surfacing of a different size grading and of a different color than the tab-simulating areas of the base lamina exposed between said tabs.

15. A laminated asphalt composition strip shingle according to claim 10, in which the granule surfaced coating layer of the tab-simulating areas of the base lamina exposed between the tabs has had its surface texture altered by embossing with vertical lines and the tabs of the overlay lamina are smooth.

16. A laminated asphalt composition strip shingle according to claim 10, in which the granule surfaced coating layer of the overlay tabs is embossed with a texture pattern of spaced lines and the granule surfaced coating layer of the tab-simulating areas of the base lamina is embossed with a different texture pattern as to spacing of lines and depth and width of embossing.

17. A laminated asphalt composition strip shingle according to claim 10, in which the base lamina is 12" x 36", the overlay lamina is 8 7/16" x 36", the tab widths at the bottom edges are, respectively, 6", 7½" and 5½" and the widths of the tab-simulating spaces at their bottom edges are, respectively, 4½", 8¾" and 3¾", the vertical alignment marks are 1 3/16" below the top edge of the overlay lamina, the overlay lamina is offset laterally ⅜" from the right end of the strip, the left end overlay tab is flush with the lower edge of the base lamina, the middle tab extends ½" and the right end tab extends ¼" below said lower edge, and the horizontal laying marks are positioned 4⅜", 5⅜" and 9⅜" from the right end and 3⅝", 4⅝" and 8⅝", respectively, from the left end of the base lamina.

18. A laminated asphalt composition strip shingle according to claim 10, in which the base lamina is 12" x 36", the overlay lamina is 8 7/16" x 36", the tab widths at the bottom edges are, respectively, 4", 9½" and 5" and the widths of the tab-simulating spaces at their bottom edges are, respectively, 4¾", 6¾" and 6", the vertical alignment marks are 1 3/16" below the top edge of the overlay lamina, the overlay lamina is offset laterally ⅜" from the right end of the strip, the left end overlay tab is flush with the lower edge of the base lamina, the middle tab extends ¼" and the right end tab extends ½" below said lower edge, and the horizontal laying marks are positioned 4⅜", 5⅜" and 9⅜" from the right end and 3⅝", 4⅝" and 8⅝", respectively, from the left end of the base lamina.

19. A laminated asphalt composition strip shingle according to claim 10, in which the reverse side of the base lamina has a strip of adhesive asphalt, centered 1½" from the lower edge of the base lamina, and a release tape of greater width centered 1½" from its upper edge, said adhesive asphalt strip when activated by solar heat, after the shingles have been laid on a roof, sealing the shingle to the shingles of the underlying course to render the roof covering wind-resistant.

References Cited

UNITED STATES PATENTS

| | | | |
|---|---|---|---|
| 1,705,497 | 3/1929 | Overbury | 52—557 |
| 1,776,949 | 9/1930 | Lumbard | 52—540 |
| 1,958,560 | 5/1934 | Beckman | 52—557 |
| 2,171,010 | 8/1939 | Schuetz et al. | 52—555 |
| 2,199,760 | 5/1940 | Schuetz | 52—555 |
| 3,377,762 | 4/1968 | Chalmers et al. | 52—555 |
| 3,407,556 | 10/1968 | Leibrook | 52—559 |

ALFRED C. PERHAM, Primary Examiner

U.S. Cl. X.R.

52—173, 419, 555, 557